United States Patent
Lecocq et al.

(10) Patent No.: US 10,074,211 B2
(45) Date of Patent: Sep. 11, 2018

(54) METHOD AND DEVICE FOR ESTABLISHING THE FRONTIER BETWEEN OBJECTS OF A SCENE IN A DEPTH MAP

(71) Applicant: THOMSON LICENSING, Issy de Moulineaux (FR)

(72) Inventors: Pascal Lecocq, Saint Gregoire (FR); Pascal Gautron, Rennes (FR); Jean-Eudes Marvie, Betton (FR)

(73) Assignee: THOMSON LICENSING, Issy-les-Moulineaux (FR)

( * ) Notice: Subject to any disclaimer, the term of this patent is extended or adjusted under 35 U.S.C. 154(b) by 251 days.

(21) Appl. No.: 14/767,337

(22) PCT Filed: Feb. 7, 2014

(86) PCT No.: PCT/EP2014/052395

§ 371 (c)(1),
(2) Date: Aug. 12, 2015

(87) PCT Pub. No.: WO2014/124870

PCT Pub. Date: Aug. 21, 2014

(65) Prior Publication Data

US 2015/0371433 A1    Dec. 24, 2015

(30) Foreign Application Priority Data

Feb. 12, 2013  (EP) .................................... 13305165
Jun. 12, 2013  (EP) .................................... 13305793

(51) Int. Cl.
*G06T 15/40*    (2011.01)
*G06T 15/60*    (2006.01)

(52) U.S. Cl.
CPC ............ *G06T 15/405* (2013.01); *G06T 15/60* (2013.01)

(58) Field of Classification Search
None
See application file for complete search history.

(56) References Cited

U.S. PATENT DOCUMENTS 7,119,806 B1   10/2006  Donovan et al.
2006/0209065 A1*  9/2006  Lapidous ................ G06T 15/40
                                                345/422

(Continued)

FOREIGN PATENT DOCUMENTS

| CN | 101055645 | 10/2007 |
| CN | 101271588 | 9/2008 |
| CN | 102254340 | 11/2011 |

OTHER PUBLICATIONS

Lecocq et al: "Sub pixel shadow mapping-Interactive 3D graphics and games", ACM, 2 Penn Plaza Suite 701 New York NY, 10121-0701 USA, Mar. 14, 2014, pp. 103-110.

(Continued)

*Primary Examiner* — Michelle Chin
(74) *Attorney, Agent, or Firm* — Tutunjian & Bitetto, P.C.

(57) ABSTRACT

A method and device for establishing a frontier between a first object and at least a second object of a scene in the space of a depth map, at least a part of the first object and at least a part of the at least a second object being visible from the point of view associated with the depth map through a set (3) of elements of the depth map. Thereafter, the method comprises comparing, for a point of the scene visible through a first element of said set, depth information associated with the point with depth information associated with said first element and with depth information associated with the other elements, called second elements; establishing a line representative of a direction associated with the frontier between the first object and the at least a second object from the comparison results; selecting a part of the vertices of surface elements visible through the set according to the (Continued)

orientation of normal associated with the vertices; and establishing the frontier from the coordinates of the selected vertices expressed in the space of the depth map.

17 Claims, 9 Drawing Sheets

(56) References Cited

U.S. PATENT DOCUMENTS

2009/0006052 A1* 1/2009 Zhou .................. G06T 15/50 703/5
2009/0109222 A1 4/2009 Dai et al.
2012/0287132 A1 11/2012 Dai et al.

OTHER PUBLICATIONS

Sen et al: "Shadow silhouette maps"; ACM transactions on graphics, vol. 22, N° 3, Jul. 27, 2003, pp. 1-6.
Wang et al: "Shadow geometry maps for alias-free shadows"; Science China Information Sciences, vol. 56, n°6, Oct. 20, 2012, pp. 1-12.
Reeves et al: "Rendering anti-aliased shadows with depth maps"; Proceedings of the 14th annual conference on computer graphics and interactive techniques, Siggraph 27, vol. 21, Jul. 27. 1987, pp. 283-291.
Chai et al:"A Depth Map Representation for Real-Time Transmission and View-Based Rendering of a Dynamic 3D Scene"; Vision Technologies Business Unit; Proceedings of the First International Symposium on 3D Data Processing Visualization and Transmission (3DPV* 02)—2002; pp. 1-8.
Brabec et al: "Practical shadow mapping";Journal of Graphics Tools,7:9-18, 2000; pp. 1-9.
Hasselgren et al: "Conservative Rasterization"; Addison-Wesley Professional, 2005; pp. 1-12.

Hertel et al: "Hybrid GPU rendering pipeline for alias-free hard shadows"; Eurographics Association, Geneva, pp. 59-66, 2009.
Williams: "Casting curved shadows on curved surfaces"; In Proceedings of the 5th annual conference on Computer graphics and interactive techniques, SIGGRAPH '78, pp. 270-274.
Aila et al: "Alias-free shadowmaps"; In Proc. Eurographics Symposiumon Rendering 2004, pp. 161-166. Eurographics Association, 2004.
Crow: "Shadow algorithms for computer graphics"; In Proceedings of the 4th annual conference on Computer graphics and interactive techniques, SIGGRAPH 1977, pp. 242-248, 1977.
Search Report dated Jun. 17, 2014.
Michael Bunnell et al, Chapter 11. Shadow Map Antialiasing, https://developer.nvidia.com/sites/all/modules/custom/gpugems/books/GPUGems/gpugems_ch11.html, Sep. 2007 Pearson Education, Inc. Upper Saddle River, NJ.
Dai et al, Reconstructable Geometry Shadow Maps I3D '08 Proceedings of the 2008 symposium on Interactive 3D graphics and games Feb. 15, 2008 Article 4 ACM New York, NY.
Sintorn et al, Sample Based Visibility for Soft Shadows Using Alias-Free Shadow Maps EGSR '08 Proceedings of the Nineteenth Eurographics conference on Rendering Jun. 23, 2008 pp. 1285-1292 Eurographics Association Aire-la-Ville, Switzerland, Switzerland.
Sintorn et al, An Efficient Alias-free Shadow Algorithm for Opaque and Transparent Objects Using Per-triangle Shadow vols. SA '11 Proceedings of the 2011 SIGGRAPH Asia Conference Dec. 12, 2011 Article 153 ACM New York, NY.
Stamminger et al, Perspective Shadow Maps SIGGRAPH '02 Proceedings of the 29th annual conference on Computer graphics and interactive techniques Jul. 23, 2002 pp. 557-562 ACM New York, NY.
Wimmer et al, Light Space Perspective Shadow Maps EGSR'04 Proceedings of the Fifteenth Eurographics conference on Rendering Techniques Jun. 21, 2004 pp. 143-151 Eurographics Association Aire-la-Ville, Switzerland, Switzerland.

* cited by examiner

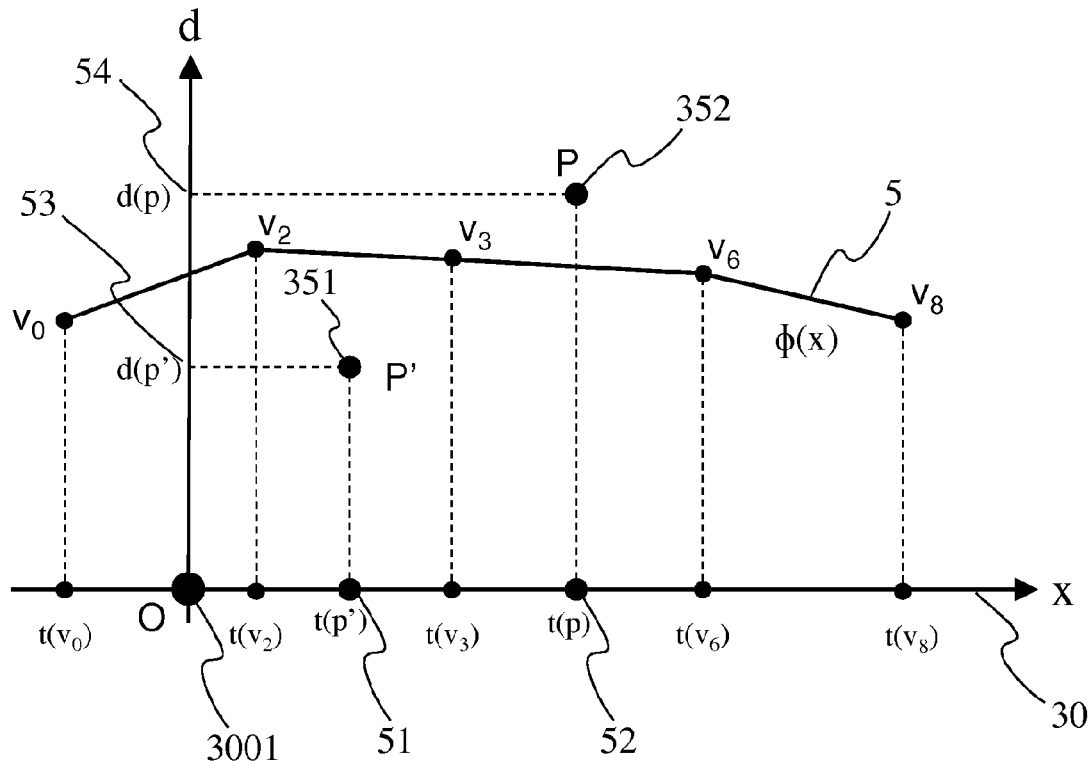
Fig 5
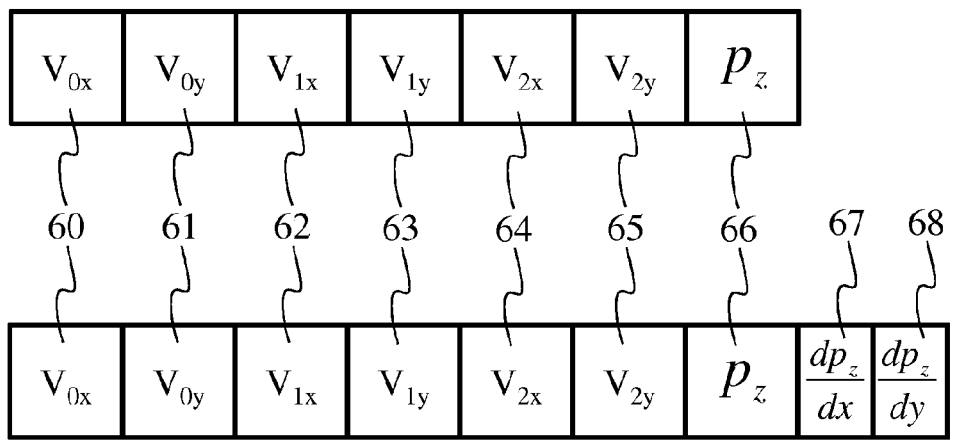
Fig 6A
Fig 6B

METHOD AND DEVICE FOR ESTABLISHING THE FRONTIER BETWEEN OBJECTS OF A SCENE IN A DEPTH MAP

This application claims the benefit, under 35 U.S.C. § 365 of International Application PCT/EP2014/052395, filed Feb. 7, 2014, which was published in accordance with PCT Article 21(2) on Aug. 21, 2014 in English and which claims the benefit of European patent application No. 13305165.6 filed Feb. 12, 2013 and of European patent application No. 13305793.5 filed Jun. 12, 2013

1. DOMAIN OF THE INVENTION

The invention relates to the domain of depth map and more specifically to the establishing of the frontier between objects of a scene. The invention is also understood in the context of Computer Generated Image (CGI or 3D-CGI).

2. PRIOR ART

According to the prior art, it is known to associate a depth map with an image representing a scene, the image being either a synthesis image representing a virtual scene or an image of a real scene shot by a camera. It is also known to use the depth information comprised in the depth map to perform visibility tests, i.e. to determine which point (i.e. which fragment) of the scene is hidden by another point (or fragment) of the scene according to a camera field of view. A depth map typically corresponds to an array of N lines and M columns of elements, also called pixels or texels, a single depth information being associated with each element of the depth map. The finite resolution of the depth map leads to some approximations when determining if a first point of the scene is hidden by (or in the shadow of) a second point of the scene, the depth of which with regard to the camera field of view being stored in an element (also called pixel or texel) of the depth map. The resulting aliasing is known as perspective aliasing, which particularly occurs when the mapping of pixels in view space (i.e. pixels of the image representing the scene) to elements in the depth map is not a one-to-one ratio, i.e. too many view-space pixels map to the same depth map element. FIG. 2 illustrates such a problem with a depth map 2 comprises a set of elements 21 to 29. Triangles 201, 202 and 203 correspond to the projection of surface elements (for example mesh elements) of a modelled object of the scene located in the foreground with regard to other objects of the scene. According to the shadow mapping algorithm of the prior art, elements of the depth map are associated with surface elements of the scene if the centre of this elements belong to the projection of the surface elements into the depth map 2. For example, the element 25 is associated with the foreground object as the centre C 253 of the element 25 belongs to the triangle 202. Elements 26, 27 and 28 are also associated with surface elements of the foreground object as their centre respectively belong to the triangles 203, 201 and 202. Elements associated with surface elements of the foreground object are filled with grey whereas elements 21 to 24 and 29 associated with surface elements of other object(s) of the scene are filled with white. According to the example of FIG. 2, several pixels of the image of the scene associated with the depth map 2 map to the element 25, which means that several points of the scene may project into the element 25. Points P 252 and P' 252 correspond to the projection of two different points of the scene, each point of the scene being associated with a pixel of the image of the scene. As to determine if the points of the scene are lit on in shadow, the distance between the point of view associated with the depth map and a point of the scene is compared to the distance stored in the element 25 of the depth map into which the point of the scene projects. As both points of the scene projects into the element 25, these both points are considered to be lit (i.e. they belong to the foreground object associated with the element 25). But as it is illustrated on FIG. 2, one can easily sees that it is not true as the projection point P' 252 does lie inside one of the triangles 201, 202 and 203, whereas the projection point P 251 does lie inside the triangle 202. The frontiers between the foreground object (illustrated by the projection of its surface elements, i.e. illustrated by triangles 201, 202 and 203) and other object(s) (this frontier also corresponding to the frontier between light and shadow) correspond actually to the outside edges of the triangles 201, 202 and 203, i.e. the edges $[V_0V_1]$, $[V_3, V_4]$, $[V_0V_2]$ and $[V_2V_4]$. But these frontiers cannot not be easily established by the shadow mapping method of the prior art or any other method of the prior art.

3. SUMMARY OF THE INVENTION

The purpose of the invention is to overcome at least one of these disadvantages of the prior art.

More specifically, the purpose of the invention is to establish the frontier between a first object and second object(s) of a scene in the depth map associated with the scene.

The invention relates to a method for establishing a frontier between a first object and at least a second object in a depth map associated with a scene according to a point of view, the scene comprising the first object and the at least a second object, at least a part of the first object and at least a part of the at least a second object being visible from the point of view associated with the depth map through a set of elements of the depth map, the first object and the at least a second object being modelled with surface elements. The method comprises the following steps:

- comparing, for a point of the scene visible through a first element of the set of elements of the depth map, depth information associated with the point with depth information associated with the first element and with depth information associated with the other elements, called second elements, of the set of elements,
- establishing a line representative of a direction associated with the frontier between the first object and the at least a second object from the comparison results,
- selecting a part of the vertices of the surface elements visible through the set of elements according to the orientation of normal associated with the vertices,
- establishing the frontier between the first object and the at least a second object from the coordinates of the selected vertices expressed in the space of the depth map.

According to a particular characteristic, the set of elements correspond to a block of elements centred on the first element, the second elements surrounding the first element.

Advantageously, the selected vertices correspond to the vertices having an associated normal vector oriented toward the line.

According to a specific characteristic, the method further comprises establishing whether the point belongs to the first object by comparing the position of a point resulting from the projection of the point into the first element with respect to the frontier.

Advantageously, the depth information associated with the first element and each second element corresponds to the depth between the point of view and a fragment of the scene associated with respectively the first element and each second element, the fragment corresponding to the fragment visible from the point of view along viewing directions passing through the first element and each second element respectively.

According to another characteristic, the method further comprises storing, in each element of the set of elements, the coordinates of at least the selected vertices of the surface element visible through the element.

Advantageously, the method further comprises establishing an origin of the line from the comparison results, the origin corresponding to one of the corners of the depth map.

According to a particular characteristic, the line is established by comparing the set of elements of the depth map with predetermined patterns of sets of elements.

According to another characteristic, the method further comprises rendering an image of the scene associated with the depth map, the rendering of the pixels representing the first object and the at least second object being performed according to the established frontier.

Advantageously, the method further comprises storing, in each element of the set of elements, an information representative of a variation of depth in the element in the space of the depth map.

The invention also relates to a device configured for establishing a frontier between a first object and at least a second object in a depth map associated with a scene according to a point of view, the scene comprising the first object and the at least a second object, at least a part of the first object and at least a part of the at least a second object being visible from the point of view associated with the depth map through a set of elements of the depth map, the first object and the at least a second object being modelled with surface elements. The device comprises at least one processor (920) configured for:

comparing, for a point of the scene visible through a first element of the set of elements of the depth map, depth information associated with the point with depth information associated with the first element and with depth information associated with the other elements, called second elements, of the set of elements,
  establishing a line representative of a direction associated with the frontier between the first object and the at least a second object from the comparison results,
  selecting a part of the vertices of the surface elements visible through the set of elements according to the orientation of normal associated with the vertices,
  establishing the frontier between the first object and the at least a second object from the coordinates of the selected vertices expressed in the space of the depth map.

Advantageously, the at least one processor is a Graphical Processor Unit (GPU).

According to a specific characteristic, the at least one processor is further configured for establishing whether the point belongs to the first object by comparing the position of a point resulting from the projection of the point into the first element with respect to the frontier.

According to another characteristic, the at least one processor is further configured for storing, in each element of the set of elements, the coordinates of at least the selected vertices of the surface element visible through the element.

The invention also relates to a computer program product comprising instructions of program code for execution by at least one processor to perform the method for establishing a frontier between a first object and at least a second object in a depth map, when the program is executed on a computer.

4. LIST OF FIGURES

The invention will be better understood, and other specific features and advantages will emerge upon reading the following description, the description making reference to the annexed drawings wherein:

FIG. 5 shows a frontier between objects of the scene of FIG. 1, according to a particular embodiment of the invention;

FIGS. 6A and 6B show information stored in an element of the depth map of FIG. 1, according to two particular embodiments of the invention;

Figure 1:
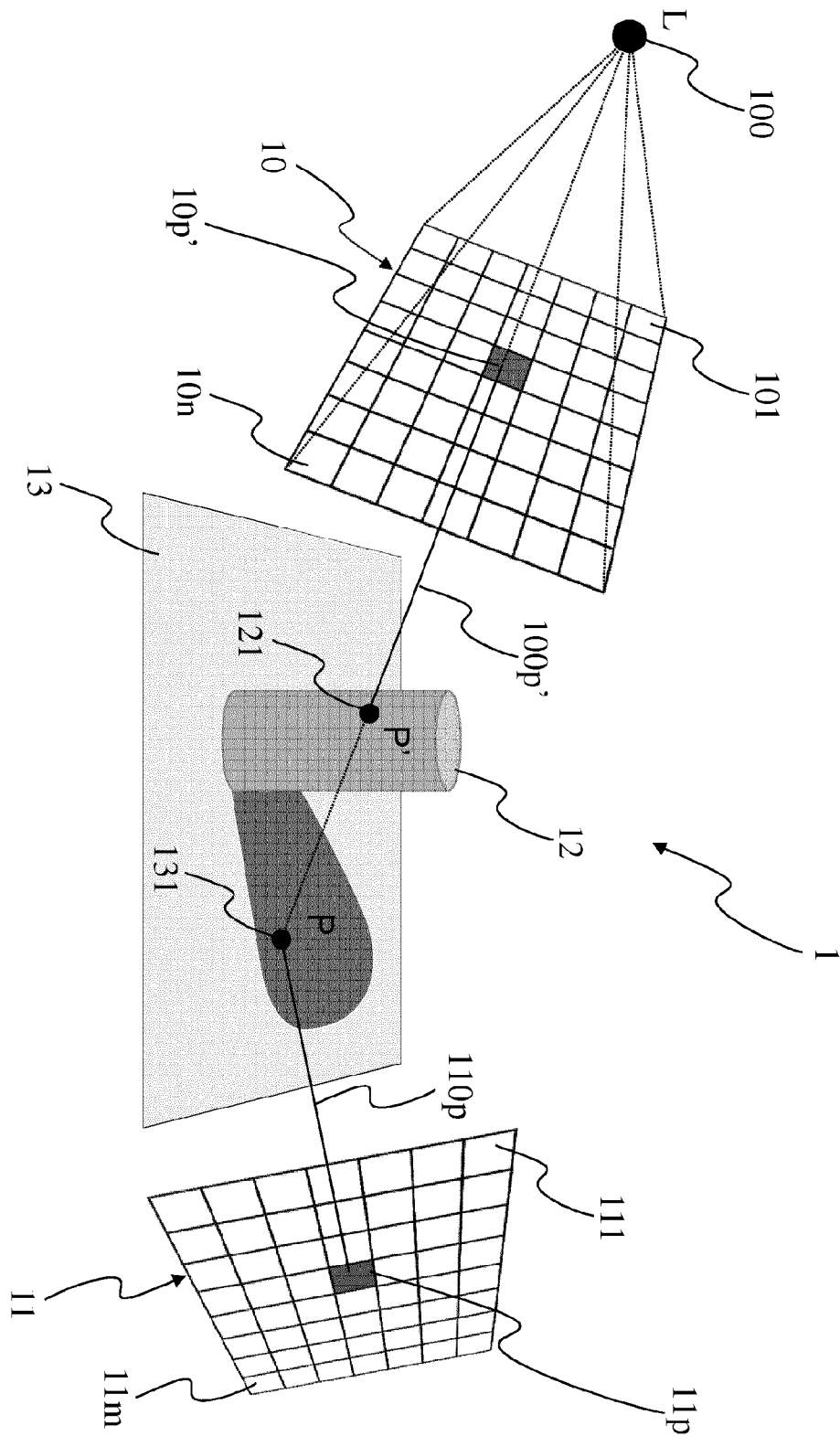
FIG. 1 shows an image and a depth map associated with a scene, according to the prior art.
Figure 9:
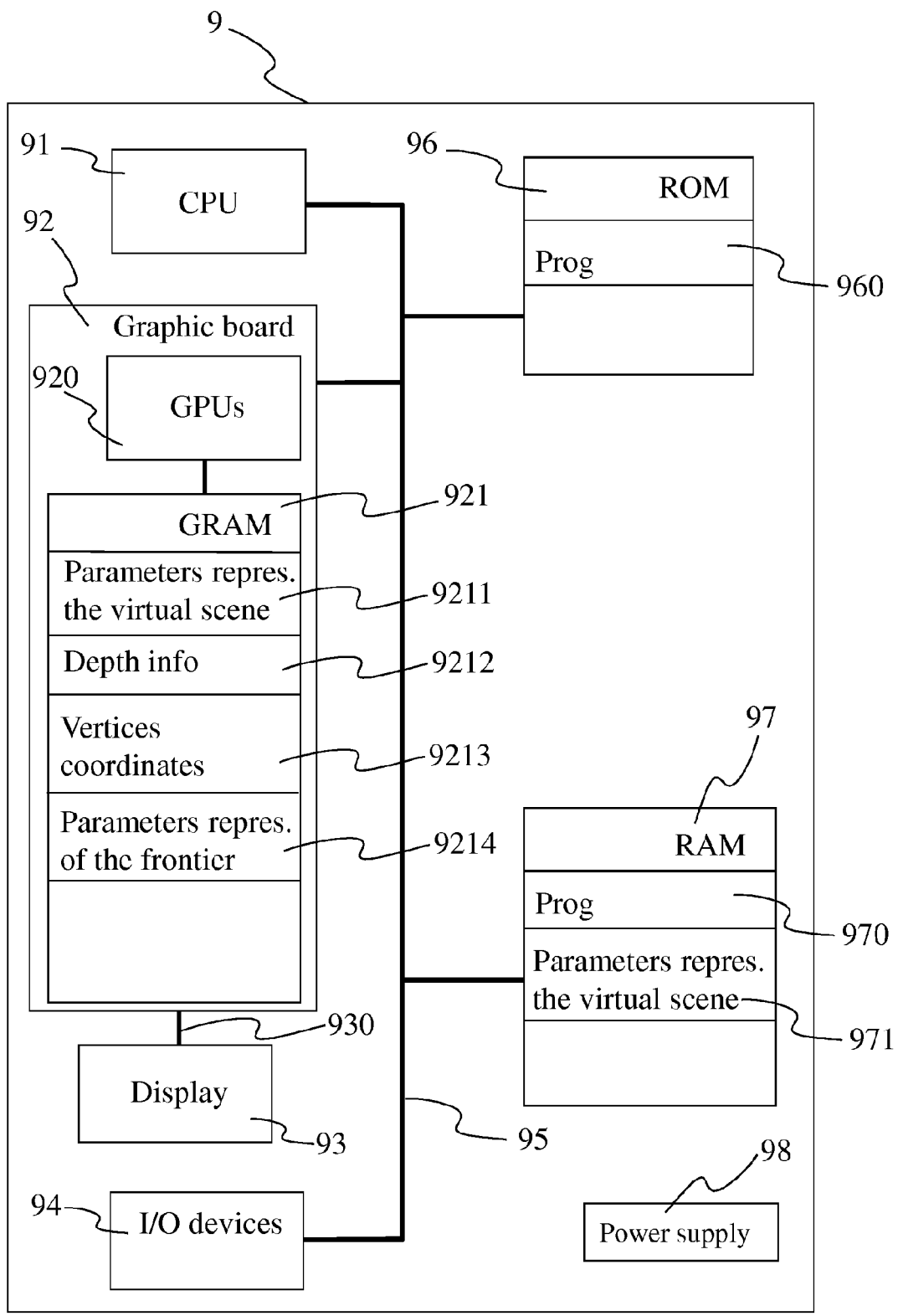
Figure 10:
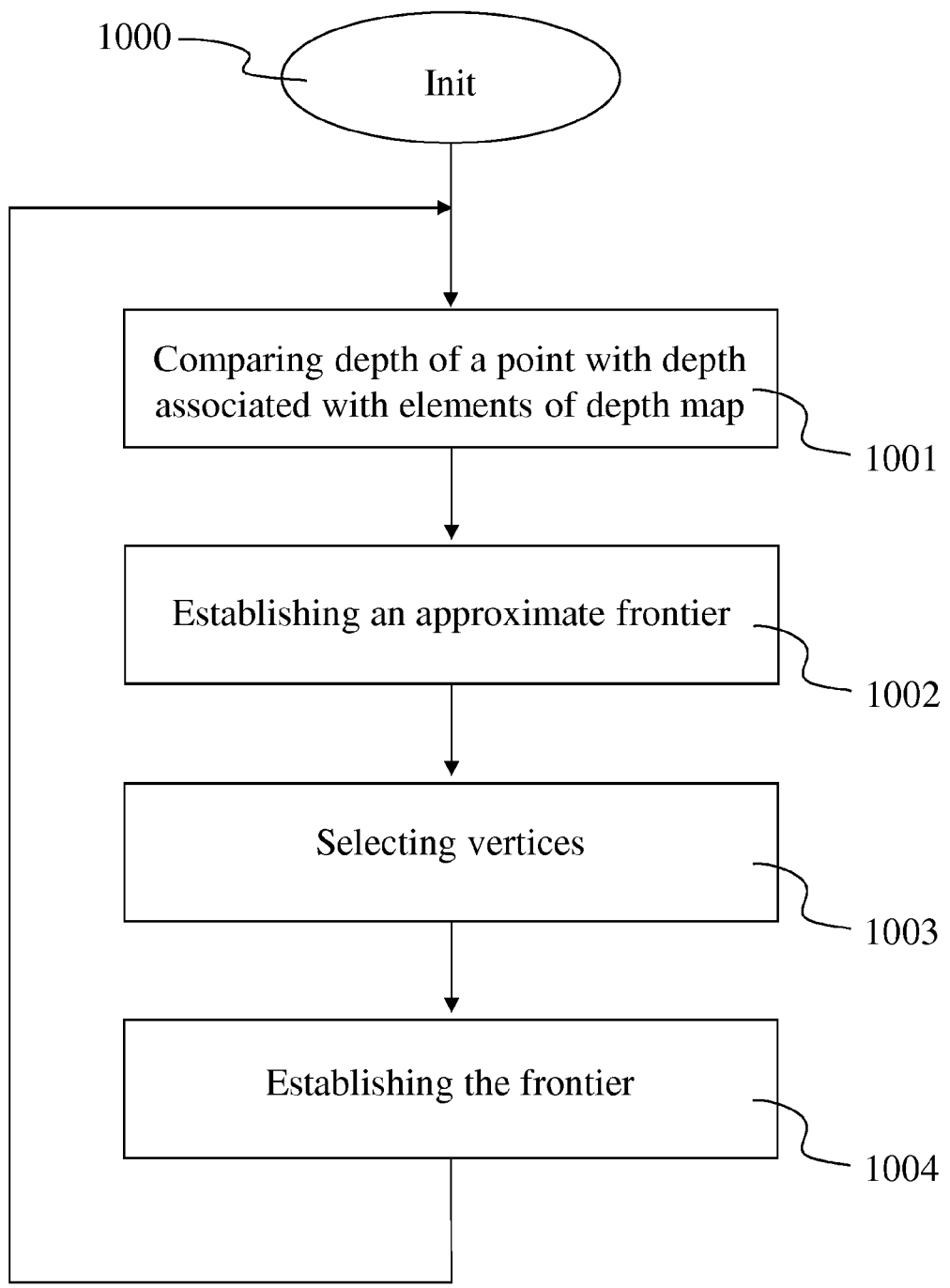

FIG. 9 diagrammatically shows a device implementing a method for establishing a frontier between objects of the scene of FIG. 1, according to a particular embodiment of the invention;

FIG. 10 shows a method for establishing a frontier between objects of the scene of FIG. 1, according to a particular embodiment of the invention.

5. DETAILED DESCRIPTION OF EMBODIMENTS OF THE INVENTION

The invention will be described in reference to a particular embodiment of a method for establishing a frontier between a first object and one or more second objects of a scene in the space of a depth map associated with the scene. The first object and the second object(s) are visible from the point of view associated with the depth map through a set of neighbouring elements of the depth map. The depth map advantageously corresponds to an array of L lines and M columns of elements, L and M being integers greater than 0, and is associated with a scene which is rendered in one or more images. For a point (also called fragment) of the scene projecting into one element of the set of elements of the depth map, the depth associated with this point with regard to the point of view of the depth map is compared with the depth information associated with each element of the set of elements. Based on the comparison results, it is established a line which represents a general direction of the frontier between the first object and the second object(s). Then, some of the vertices of the surface elements used to model the first object and projecting into the set of elements are selected according to the orientations of their normal vectors with regard to the line previously established. The selected vertices are then used for establishing the frontier between the first object and the second object(s). The established frontier represents the limit between the first object and the second object(s) in the space of the depth map, or in other words the frontier represents the limit between the representation, in the depth map, of the first object and of the second object(s) of the scene. This frontier also represents the shadow border of the shadow that may be generated by the first object. Establishing which part of the depth map is covered by the projection of the surface elements used for modelling the first object provides with an information on which point (fragment) of the scene may be in the shadow of the first object, depending also on the depth associated with this point (fragment). In other words, each point (fragment) of the scene projecting onto one point of the depth map located inside the area of the depth map associated with the first object may be shadowed by the first object, depending on its depth.

The establishing of a precise frontier or limit between a first object and one or more second objects enables to determine which point of the scene belongs to the first object and which don't, especially inside one element of the depth map associated with several pixels of the image of the scene, each pixel of the scene being associated with a point (corresponding to a fragment of the scene). This is particularly useful for rendering with more detail and without perspective aliasing the shadow generated by the first object (especially when the first object is in the foreground with regard to the second object(s) when seen from the light source, which then corresponds to the point of view of the depth map) when rendering an image of the scene using the depth map and the frontier between the first and second objects established in the space of the depth map, especially when the resolution of the depth map is less than the resolution of the image. This is also very useful when the point of view of the depth map is the same as the point of view of the image to be rendered, the established frontier enabling to render with great detail the frontier/limit between the first and second objects when rendering the image, which enables to perform anti-aliasing or zoom-in without pixelization issues.

FIG. 1 shows a scene 1 rendered in an image 11 with an associated depth map 10, according to a particular and non-limitative embodiment. The image 11 represents the scene 1 as viewed from a given point of view (also called camera field of view, not represented on FIG. 1) and the depth map is generated according to another point of view 100 (i.e. another camera field of view). The scene corresponds for example to a virtual scene and comprises several virtual objects, i.e. a first object 12 and a second object 13. The objects 12 and 13 are modelled according to any method known to those skilled in the art, for example by polygonal modelling, in which the model is assimilated with a set of polygons (surface elements, also called mesh elements) each defined by the list of summits and edges that compose it. By virtual object is understood any virtual representation (obtained by modelling) of an object (real or fictitious) composing a real environment/real scene (for example the ground, a house or a house front, a person, a car, a tree, that is to say any element composing an environment such as a part of a house, a street, a town, the countryside, etc.) or an imaginary element. Each object 12, 13 of the scene 1 is characterized by a surface covering it, the surface of each object having reflectance properties (corresponding to the proportion of incident light reflected by the surface in one or several directions) that are specific to it.

The depth map 10 comprises n elements 101 . . . $10p'$ . . . $10n$, n being an integer greater than 0 that defines the resolution of the depth map 10, the resolution being for example equal to 512×512 pixels, 1024×1024 pixels or 4096×4096 pixels. A depth information is advantageously associated with each element of the depth map 10. This depth information corresponds to the distance between the point of view 100 and the closest visible point (fragment) of the scene 1 along a viewing direction passing through an element of the depth map, this element of the depth map being associated with the closest visible point (fragment) of the scene. By taking the element $10p'$ as an example, the depth information associated with this element $10p'$ corresponds to the distance between the point of view 100 and the point (fragment) P' 121 of the scene 1 along the viewing direction $100p'$ having as origin the point of view 100 and passing through the element $10p'$, advantageously passing through the centre of the element $10p'$. The fragment P' 121 corresponds to the first element of the scene crossed by the viewing direction $100p'$ when starting from the point of view 100. The depth information is associated with the centre of the corresponding element of the depth map.

The image 11 comprises m pixels 111 . . . $11p$ . . . $11m$, m being an integer greater than 0 that defines the resolution of the image 11. Advantageously, m is different from n, for example n is greater than m (the resolution of the depth map is for example 512×512 pixels, 1024×1024 pixels or 4096× 4096 pixels whereas the resolution for the image 11 is for example 1024×768 pixels, 1280×720 pixels or 1920×1200 pixels). According to a variant, m is greater than n. According to another variant, m is equal to n, both depth map 10 and image 11 having the same resolution. Attributes are advantageously associated with each pixel of the image 11, the attributes comprising for example color information (for example RGB information) and/or the translucent character of the fragment of the scene associated with a pixel of the image. A fragment advantageously corresponds to a surface element associated with a point of the scene 1, the size of which being equal to the size of a pixel of the image 11 that may be displayed to represent the scene 1 on a display screen. A fragment of the scene 1 becomes a pixel in the image if the fragment is visible from the point of view associated with the image 11. For clarity purpose, an element of the scene 1 will be called a fragment or a point when positioning in the space of the 3D scene (the world space) and the same element visible from the point of view associated with the image 11 will be called pixel when positioning in the space of the image 11. A point (fragment) visible from the point of view associated with the image 11 and the corresponding pixel in the image thus refers to one and a same element of the scene 1 and may be mixed up in the rest of the description. Advantageously the point (fragment) is defined by a set of data grouping together one or several of the following data items:

the rasterization position of the point (fragment),
the depth of the point (fragment) at the viewpoint,
attributes (for example the colour, the texture coordinates),
the alpha channel representative of the translucent character of the point (fragment).

As to determine whether a point (fragment) of the scene is visible from the point of view of the image 11, the well-known z-buffer method (also known as z-buffer algorithm) is used in association with one or more depth maps having the same point of view as the image 11 and having a structure similar to the depth map 10. The one or more depth maps having the same point of view as the image 11 and being used in the z-buffer algorithm are also called z-buffer(s). According to this method and by taking the pixel $11p$ of the image 11 as an example, the depths of the fragments of the scene located along the viewing direction 110*p* having as origin the point of view of the image 11 and passing through the centre of the pixel 11*p* are compared, and the fragment P 131 having the smallest depth (i.e. the shortest distance from the point of view along the viewing direction 110*p*) is the one whose attributes are associated with the pixel 11*p*. According to a variant, the well-known painter's algorithm is used for solving the visibility problem as to determine which fragment of the scene is visible for each pixel of the image 11 from the point of view of the image 11.

According to the example of FIG. 1, the point of view 100 advantageously corresponds to the light source of the scene 1 and the depth map 10 is used to determine which fragment of the scene 1 is lit by the light source and which fragment of the scene is in shadow. According to this example, the depth map 10 may also be called a shadow map. Then, as to determine whether the fragment P 131 (corresponding to the pixel 11*p* of the image 11) is lit or in the shadow of an object of the scene 1, the fragment P 131 is projected into the depth map along a viewing direction linking the point of view 100 and the fragment P 131. The distance ∥LP∥ between the point of view 100 and the fragment P 131 is compared to the depth information ∥LP'∥ associated with the centre of the element 10*p*' corresponding to the projection of the fragment P 131 into the depth map 10. If ∥LP∥ is greater than ∥LP'∥, then the fragment P 131 is in the shadow of the fragment P' 121 (i.e. the fragment P 131 is not directly lit by the light source L). If ∥LP∥ is less than or equal to ∥LP'∥, then the fragment P 131 is directly lit by the light source L. According to a variant, the depth information with which the distance ∥LP∥ is compared is retrieved from the depth information associated with the centre of the element 10*p*' and from a first information representing the variation of depth inside the element 10*p*' (this first information being established as explained with more details with regards to FIGS. 8A, 8B and 8C). This variant enables to determine with a better precision whether the fragment P 131 is lit or not by another fragment of the scene, especially when the projection point of the fragment P' 131 into the depth map does not coincide with the centre of the element 10*p*' while belonging to the element 10*p*'. This enables to correct some defects related to the finite resolution of the depth map 10. Determining whether a fragment if lit enables to associate video information (e.g. RGB data) with the considered fragment in harmony with the character lit or not lit of the fragment when rendering the scene in the image 11, i.e. when rendering the pixels of the image 11 associated with the considered fragment. The rendering of the pixels of the image is then more precise with less or no artefact when compared to rendering method using depth maps of the prior art.

According to a variant, the scene 1 is a real scene shot by a camera device generating the image 11 and advantageously one or more other images according to different points of view as to generate a stereoscopic image of the scene. According to this variant, a depth map is generated according to the same point of view as the image 11, the depth map and the image 11 being associated with each other. Depth maps associated with the other images of the scene may also be generated. The depth information associated with the centre(s) of the element(s) of the depth map is for example generated via a depth sensor associated with the camera. According to another example, the depth map is generated by comparing two images of the scene 1 acquired according to two different points of view (for example a left image and a right image of the scene), a disparity information being retrieved by comparing on a pixel basis the two images for making a match between the pixels of each view by pairs of two, the disparity information corresponding to the difference in pixels according to the horizontal axis between the location of a pixel in the left image and the location of its corresponding pixel in the right image. The depth map according to this example is called a disparity map. The disparity map associated with the image 11 is representative of the disparity between image 11 (corresponding for example to a left image of a stereoscopic image) and another image of the stereoscopic image (for example the right image), another disparity map may be associated with the right image, this another disparity map being representative of the disparity between the right image and the left image 11. Each disparity map is advantageously estimated by comparison and pairing of the pixels of the left image 11 (respectively right image) to the pixels of the right image (respectively left image 11). The disparity associated with a pixel of the left image 11 (respectively right image) advantageously corresponds to the pixel distance between this pixel of the left image 11 (respectively right image) and the corresponding (or paired) pixel of right image (respectively left image 11), that is to say, the pixel of the right image (respectively left image 11) having video information (that is to say, color information) identical or similar to that of the pixel of left image 11 (respectively right image).

Figure 3:
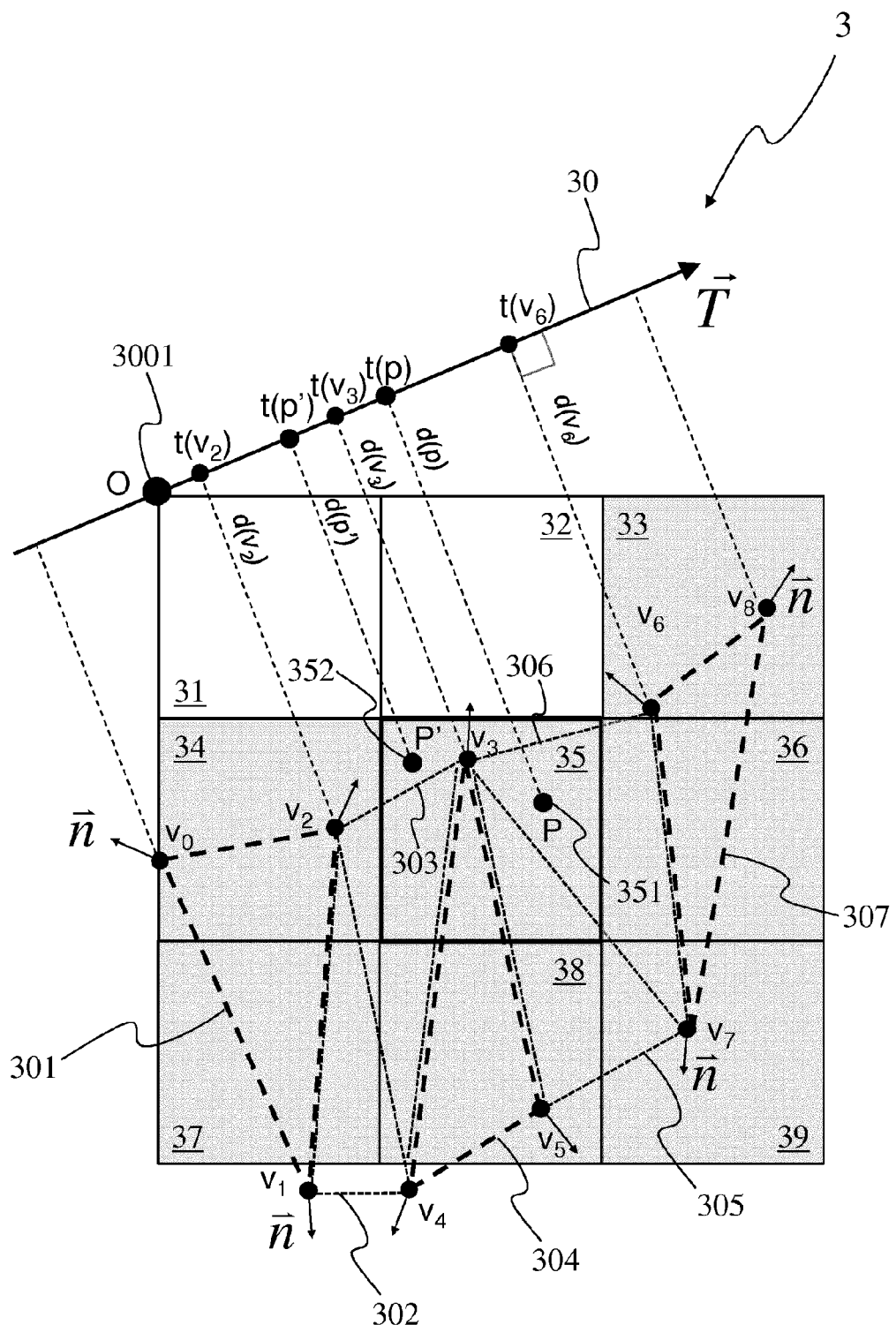
FIG. 3 shows the projection of surface elements of the scene of FIG. 1 onto the depth map of FIG. 1, according to a particular embodiment of the invention.

FIG. 3 illustrates a part 3 of the depth map 10 centred on the element 35. Triangles 301, 304 and 307 correspond to the projection of surface elements of a first object, for example the first object 12. Triangles 301, 304 and 307 correspond to the surface elements that have been rasterized during the rasterization process whereas the triangle 302, 303, 305 and 306 correspond to the surface elements that have not been rasterized during the rasterization process, which means that only a part of the surface elements may be used for rendering the scene and establishing the frontier between the first object and the second object(s) of the scene 1. The elements 33, 34, 35, 36, 37, 38 and 39 are shaded with grey as they are associated with the first object. In other words, the surface elements projecting onto the set 3 of elements are visible from the point of view associated with the depth map through the elements 33 to 39. An element of the depth map is associated with an object of the scene, or with a surface element of the scene, if the projection of this surface element into the depth map (a triangle in the non-limitative example of FIG. 3) overlaps (i.e. overlays) the centre of the element.

Figure 7A:
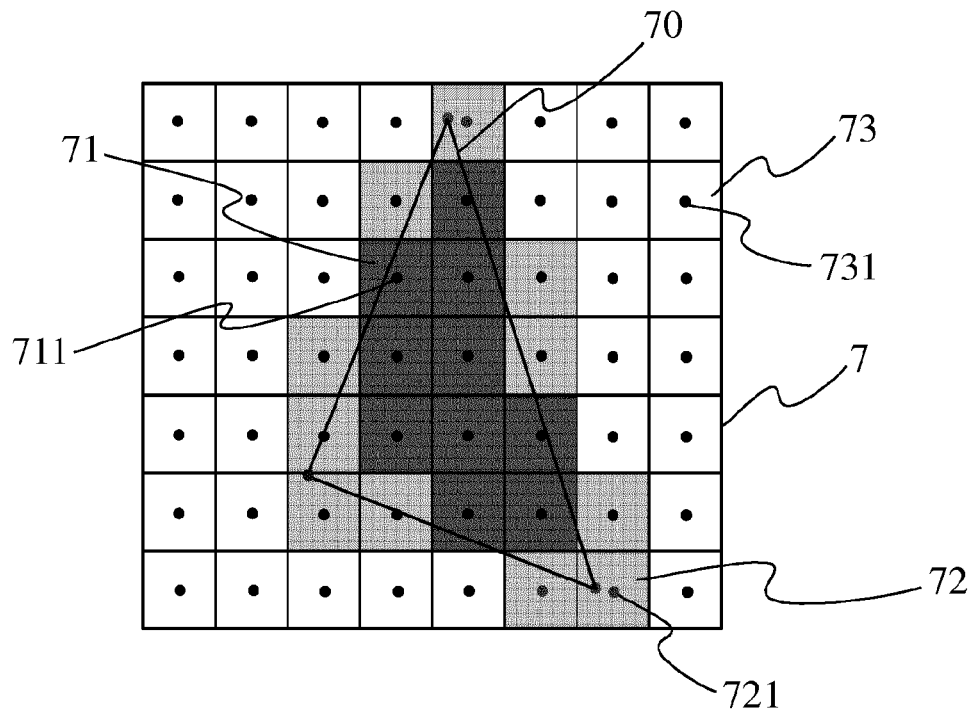
FIGS. 7A and 7B show the extension of the projection of a surface element of FIG. 3, according to a particular embodiment of the invention.
Figure 7B:
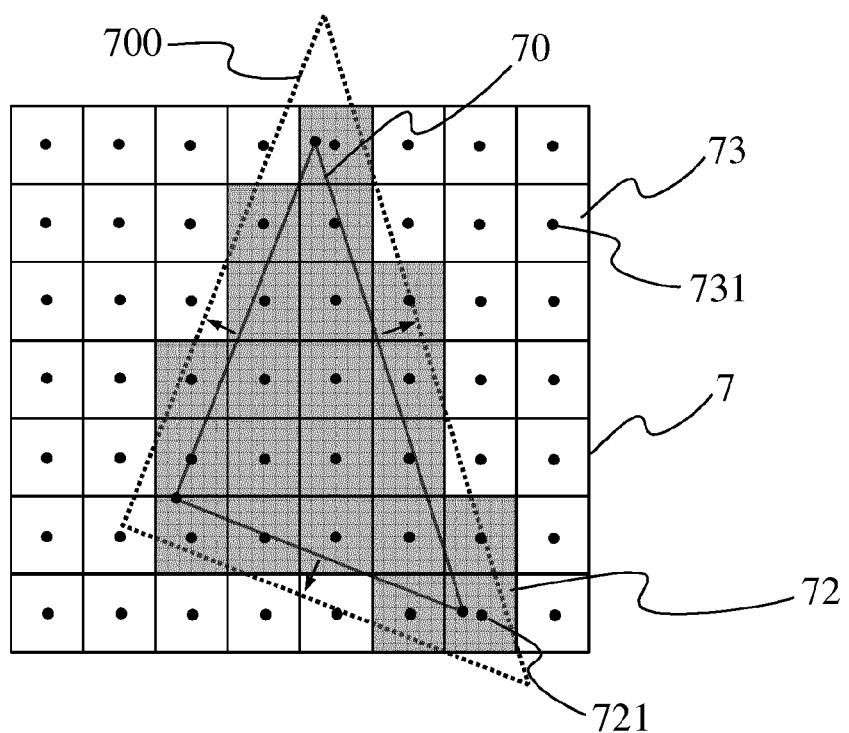

Such an embodiment is illustrated on FIG. 7A. FIG. 7A illustrates a depth map or a part of a depth map 7 comprising n elements, among which the elements 71, 72 and 73. The triangle 70 corresponds to the projection of a surface element of the first object 12 of the scene 1 for example. Elements, the centre of which is comprised inside the triangle 70, such as the element 71 with its centre 711 lying inside the space defined by the sides of the triangle 70, are associated with the surface element of the first object, which means that this surface element is visible from the point of view associated with the depth map 7 through these elements (filled in dark grey). Elements filled in light grey such as the element 72 are not associated with the surface element of the first object as their centres (like the centre 721 of the element 72) are not located inside the space defined by the edges of the triangle 70, even if they are crossed by the triangle 70. Other elements of the depth map filled with white such as the element 73 with its centre are also not associated with the surface element of the first object as the triangle 70 does not overlap their centres. As to consider the elements in light grey crossed by the triangle 70 such as the element 72, the edges triangle are advantageously extended, i.e. moved toward their normal direction, as illustrated on FIG. 7B that illustrates another embodiment. The edges are for example moved by a length equal to 0.5 time the width of an element of the depth map 7. The triangle 700 resulting from the extension of the triangle 70 is illustrated with dotted lines. The triangle 700 overlays the elements appearing in shade grey, including the elements such as the element 72, the centre of which being not overlaid by the triangle 70. The embodiment of FIG. 7B, which corresponds to conservative rasterization, is useful as it enables to consider triangles having a size that is less than an element for example. Such triangles may represent thin geometry structures (tree branches for example) but also represent triangles viewed from grazing angles, which are very important to be considered as they are responsible for the shadow silhouette.

The elements 31 and 32 of the part 3 of the depth map of FIG. 3 appears not shaded as they are not associated with the first object but for example with the second object 13 of the scene 1. The frontier between the first object and the second object in the space of the depth map corresponds to the segments [$V_0 V_2$], [$V_2 V_3$], [$V_3 V_6$], and [$V_6 V_8$] defined by the vertices $V_0$, $V_2$, $V_3$, $V_6$ and $V_8$ of the triangles 301, 304 and 307. This frontier also corresponds to the frontier/border of the shadow generated by the first object in the scene. This frontier is established as explained herein below, according to a first exemplary embodiment of the principles.

Considering a point of the scene projecting into the element 35, the projection point of the point of the scene corresponding for example to the point P 351, the depth associated with P (which corresponds to the distance between the point of view associated with the depth map and the point of the scene projecting onto P 351) is compared with the distances stored in the depth map for each element of the set 3 of elements 31 à 39. The set 3 of elements is advantageously chosen as having as a centre the element 35, called first element, surrounding by second elements corresponding to the elements 31, 32, 33, 34, 36, 37, 38 and 39. Naturally, the number of second elements is not limited to 8 but may extend to any number, for example 24. Assuming the coordinates (k, l) of the first element 35 are (0, 0), the coordinates (k, l) of the second elements are as follow: (−1, 1) for the second element 31; (0, 1) for the second element 32; (1, 1) for the second element 33; (−1, 0) for the second element 34; (1, 0) for the second element 36; (−1, −1) for the second element 37; (0, −1) for the second element 38 and (1, −1) for the second element 39. The coordinates ($G_{sx}$, $G_{sy}$) of the gravity centre $G_s$ of the elements of the set 3 of elements such as $P_{element} < P_z$ (which correspond to the elements associated with the first object, i.e. the elements comprising at least in part the projection of a surface element of the first object) are obtained as follow:

$$\binom{G_{sx}}{G_{sy}} = \frac{1}{9} \sum_{k=-1}^{k=1} \sum_{l=-1}^{l=1} \binom{k}{l} \times \begin{cases} 1 \text{ if } P_{element} \le P_z \\ 0 \text{ if } P_{element} > P_z \end{cases} \quad \text{equation 1}$$

with $P_{element}$ the depth information associated with an element of the set 3 of elements of the depth map,
$P_z$ the depth associated with the point P.

A tangent axis vector $\vec{T}$ 30 may then be determined from the coordinates of $G_s$, which enables to determine an estimated direction of the frontier between the first object and the second object. $\vec{T}$ is determined as follow:

$$\begin{cases} \vec{T} = \begin{pmatrix} 1 \\ -\frac{G_{sx}}{G_{sy}} \end{pmatrix} \text{ if } G_{sy} \ne 0 \\ \vec{T} = \begin{pmatrix} 0 \\ 1 \end{pmatrix} \text{ if } G_{sy} = 0 \end{cases} \quad \text{equation 2}$$

The tangent axis origin O 3001 is set on the corner (i.e. the angle) of the depth map located at the opposite side of the shadow generated by the first object, the shadow corresponding to the part of the depth map overlaid by the triangles associated with the first object. For illustration purpose, the origin O 3001 of the tangent axis 30 has been set on the upper left corner (angle) of the element 31 on FIG. 3 as FIG. 3 only illustrates a part of the depth map limited to the set 3 of elements. It is to be understood that the origin of the tangent axis is to be set at a corner (angle) of the depth map 10 as a whole. The coordinates ($O_x$, $O_y$) of the origin O 3001 are established from the coordinates of the centre of gravity $G_s$ with the following equation:

$$\binom{O_x}{O_y} = \binom{s(G_{sx})}{s(G_{sy})} \text{ with } s(x) = \begin{cases} 0 \text{ if } x \ge 0 \\ 1 \text{ if } x < 0 \end{cases} \quad \text{equation 3}$$

According to this embodiment, the coordinates of the bottom left corner of the depth map are (0, 0), the coordinates of the bottom right corner of the depth map are (1, 0), the coordinates of the top left corner of the depth map are (0, 1) and the coordinates of the top right corner of the depth map are (1, 1).

As to establish the frontier or a function representative of this frontier, some of the vertices of the triangles 301, 304 and 307 are selected. The vertices which are selected correspond to the vertices, the normal $\vec{n}$ of which points toward the tangent axis line. The normal of the vertices $V_0$, $V_1$, $V_2$, $V_3$, $V_4$, $V_5$, $V_6$, $V_7$ $V_8$ are represented with arrows on FIG. 3. As it clearly appears, only the vertices $V_0$, $V_2$, $V_3$, $V_6$ and $V_8$ have their respective normal pointing towards the tangent line axis 30. Vertices that are selected are for example those which fulfil the following condition:

$$\vec{n} \cdot \vec{G_s} < 0 \quad \text{equation 4}$$

Selected vertices $V_0$, $V_2$, $V_3$, $V_6$ and $V_8$ are then orthogonally projected on the tangent line axis 30 and corresponding positions $t(V_i)$ on the tangent line axis 30 and distance $d(V_i)$ between the position $t(V_i)$ on the tangent line axis and the corresponding vertex $V_i$ are computed and advantageously stored in a memory structure such as a table comprising 24 cells for example (8 elements×3 coordinates) as to establish the frontier. The positions $t(V_i)$ and distances $d(V_i)$ advantageously represents points coordinates of a continuous piecewise linear function $\varphi(x)$ that fully recovers the distance from the frontier (also called shadow border or limit between objects) as illustrated on FIG. 5.

According to a variant, not all the vertices verifying the condition of equation 4 are selected. According to this variant, let's suppose that the normal associated with the vertex $V_5$ points toward the tangent axis line 30, for example because it belongs to a triangle not illustrated on FIG. 3 having edges adjacent to the vertex $V_5$ that have normal vectors pointing toward the tangent axis line 30. This vertex may be detected as the slope associated with the frontier including the vertex $V_5$ in the vicinity of $V_5$ is greater than a threshold slope, either predetermined or set by a user, which is for example equal to 1. If the slope of the frontier meet at least one of the following conditions, then the vertex V5 is discarded, i.e. not selected for establishing the frontier, as there is a slope shortage in its vicinity:

$$\frac{|d(V_5) - d(V_3)|}{|t(V_5) - t(V_3)|} > 1, \text{ and}$$

$$\frac{|d(V_5) - d(V_6)|}{|t(V_5) - t(V_6)|} > 1$$

FIG. 5 illustrates the function φ(x) 5 in the space of the depth map with a representation in a base defined by an abscissa axis corresponding to the tangent axis line 30 having as origin the point O 3001 and an ordinate axis representing the distance d from the tangent axis line 30 along the normal of the tangent axis line, according to a non-limitative embodiment of the principles. φ(x) is arranged with line segments having as extremities the selected vertices $V_0$, $V_2$, $V_3$, $V_6$ and $V_8$, the coordinates $(t(V_i), d(V_i))$ of a vertex $V_i$ (i being equal to 0, 2, 3, 6 or 8) being established from the coordinates $(V_{ix}, V_{iy})$ of the vertex $V_i$ expressed in the space of the depth map. As to determine whether the point P 351 (or its corresponding point (fragment) of the scene) is shadowed (or whether it belongs to the first object), following condition is checked:

if φ(t(P))<d(p) then P is shadowed otherwise (i.e. if φ(t(P))≥(p)) P is unshadowed          equation 5

With t(P) 52 the abscissa of P 351 and d(P) 54 the ordinate of P 351. t(p) and d(P) are advantageously computed as follow:

$$t(P) = \overrightarrow{OP} \cdot \vec{T} \qquad \text{equation 6}$$

$$d(P) = \sqrt{\|\overrightarrow{OP}\| - t(P)^2} \qquad \text{equation 7}$$

According to the example of FIGS. 3 and 5, the point P 351 is shadowed (or belongs to representation of the first object in the depth map) as the distance φ(t(P)), corresponding to the ordinate of the intersection point between φ(x) and the line having as direction (t(P)-P), is less than d(P) 54. The point P' 352 is not shadowed (or belongs to the representation of a second object in the depth map) as the distance φ(t(P')), corresponding to the ordinate of the intersection point between φ(x) and the line having as direction (t(P')-P'), is greater than d(P') 53.

According to a variant, to avoid explicit storage and ordering of the vertices along the tangent line axis 30, only the closest edges from the point P 351 are considered, for example the edges $[V_2V_3]$ and $[V_6V_8]$ or only the edge $[V_3V_6]$. For example, the edge(s) to be considered is determined once all the projections (of the selected vertices and of the point P 351) are done on the tangent axis line, the pair of vertices that is considered corresponding to the vertices projections surrounding the projection t(P) of P. In other words, the vertices that are considered according to this example are those whose abscissas $t(v_i)$ surrounds the abscissa t(P) of P. According to the example of FIG. 5, the vertices $V_3$ and $V_6$ are selected as to define a local part of the function φ(x), i.e.:

$$\varphi(x) = d(v_i) + \frac{x - t(v_i)}{t(v_j) - t(v_i)} \times (d(v_j) - d(v_i)) \qquad \text{equation 6}$$

With $V_i$ and $V_j$ the closest vertices from the point P, coordinates of $V_i$ being $(t(v_i), d(v_i))$ and coordinates of $V_j$ being $(t(v_j), d(v_j))$.

Figure 4A:
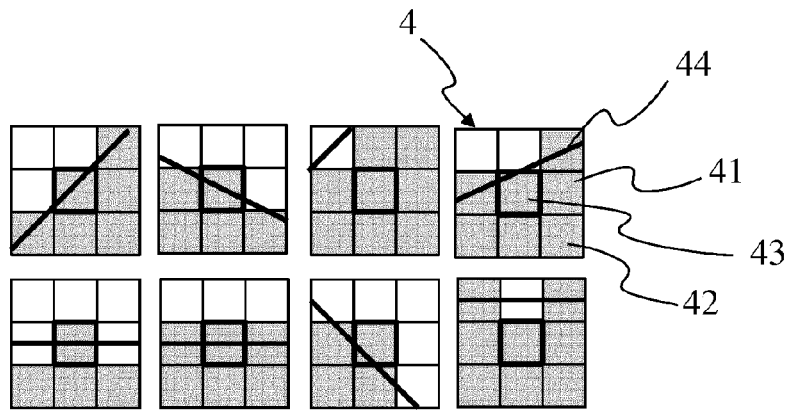
FIGS. 4A, 4B, 4C and 4D show patterns of depth map to be compared with the depth map of FIG. 1, according to a particular embodiment of the invention.
Figure 4B:
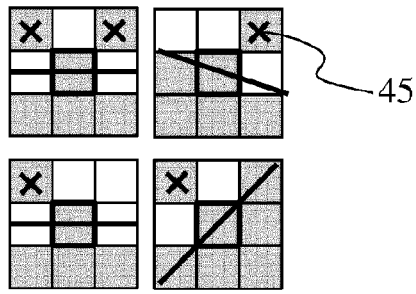
Figure 4C:
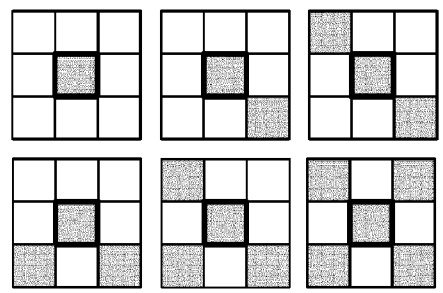
Figure 4D:
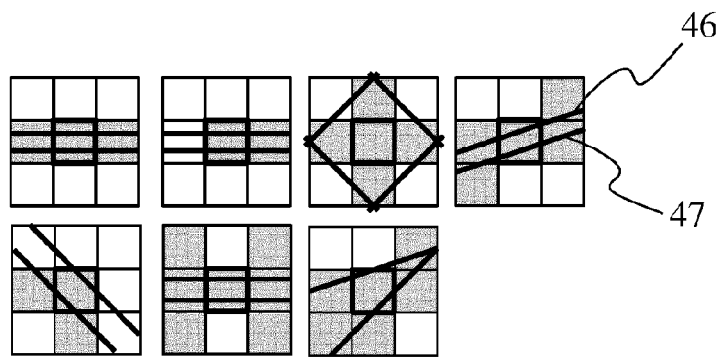

The frontier between the first object and second object(s) in the depth map may also be established according to a second exemplary embodiment of the principles. According to this second embodiment, the tangent axis line 30 is determined by comparing the set of elements 31 to 39, once having established which elements have a depth less than or equal to the depth associated with the point P 351 and which elements have a depth greater than the depth associated with the point P 351 (see equation 1), with some predetermined patterns of such sets of elements. Indeed, the location of the elements having a depth less than or equal to the depth of the point P enables to determine the orientation and the origin of the tangent axis line 30 with a comparison with a set of typical patterns. Examples of such patterns 4 are illustrated on FIGS. 4A, 4B, 4C and 4D. In all the patterns illustrated on FIGS. 4A to 4D, elements that are shaded in grey represents elements belonging to the same object as the centred element of these patterns, this object being the one generating shadow (also called occluding object, i.e. the first object). FIG. 4A illustrates first examples of patterns of sets of elements from which a tangent axis line may be established without ambiguity. It can be seen that the set 3 of elements of FIG. 3 is similar to the pattern 4 of FIG. 4A as the elements of the set 3 shaded in grey, i.e. the elements 33 to 39, are located at a same position in the set of elements that the elements shaded in grey in the pattern 4, for example the elements 41, 42 and 43. As the set 3 matches to the pattern 4, the comparison results establish that the direction of the tangent axis 30 is the direction of the tangent axis 44 of the pattern 4. FIG. 4B illustrates second examples of patterns from which the direction of the tangent axis line may be established, even if an ambiguity exists as at least one of the element (i.e. the element(s) identified with a cross like the element 45) are not consistent with the other elements shaded in grey. According to these patterns, the elements with a cross are simply not considered for establishing the direction of the tangent axis line. FIG. 4C illustrates third examples of patterns from which the direction of the tangent axis line cannot be established. FIG. 4D illustrates fourth examples of patterns from which the direction of the tangent axis line may be established with only a certain degree of uncertainty as several tangent axis line may be determined, for examples the tangent axis line 46 and 47. For these patterns, a first solution consists in establishing in which quarter of the centre element the point P lies to select the correct tangent axis and its origin, i.e. the ones being the closest from the quarter in which P lies (top left quarter or top right quarter or bottom left quarter or bottom right corner). A second solution consists in establishing the frontier for each possible tangent axis line, the area of the depth map corresponding to the first object or to the shadow generated by the first object being the area delimited by all the established frontiers. Naturally, the patterns of FIGS. 4A to 4D are only given for illustration purpose and the number of predetermined patterns is not limited to the ones illustrated on these FIGS. 4A to 4D.

According to a variant, the function φ(x) representative of the frontier is a curve established from the coordinates of the selected vertices $V_0$, $V_2$, $V_3$, $V_6$ and $V_8$. The curve passes advantageously through some of the points or close to the points. The curve may be established by any method known to the skilled person in the art, for example by implementing a linear piecewise interpolation, polynomial approximation or spline interpolation.

FIG. 6A diagrammatically illustrates the structure of a memory element (or combination of memory elements) that represents an element of the depth map, for example the element 37 illustrated on FIG. 3, according to a first particular and non limitative embodiment of the present principles. The structure comprises 7 memory blocks 60, 61, 62, 63, 64, 65 and 66 for storing information. The first two blocks 60 and 61 comprise the coordinates $V_{0x}$ and $V_{0y}$, respectively of the first vertex $V_0$ of the triangle 301 overlaying the element 37. The two following blocks 62 and 63 comprise the coordinates $V_{1x}$ and $V_{1y}$ respectively of the second vertex $V_1$ of the triangle 301 overlaying the element 37. The two following blocks 64 and 65 comprise the coordinates $V_{2x}$ and $V_{2y}$ respectively of the third vertex $V_2$ of the triangle 301 overlaying the element 37. The last block 66 of the structure comprises information representative of the depth associated with the element 37, advantageously with the centre of the element 37. The structure of the depth map is for example a 128-bits RGBA buffer, 16 bits being used for each of the blocks 60 to 65 and 32 bits being used for the block 66. Each element of the depth map stores similar information, i.e. the coordinates of the vertices of the triangle overlaying the considered element and the depth information associated with the considered element of the depth map.

FIG. 6B diagrammatically illustrates the structure of a memory element (or combination of memory elements) that represents an element of the depth map, for example the element 37 illustrated on FIG. 3, according to a second particular and non limitative embodiment of the present principles. The structure comprises 9 memory blocks 60, 61, 62, 63, 64, 65, 66, 67 and 68 for storing information. Memory blocks 60 to 66 are similar to the memory blocks having the same reference numbers and described with regard to FIG. 6A and comprise the same information. An information $dp_z/dx$ representative of the variation of depth in the element 37 along the x axis of the space of the depth map is stored in the block 67 and an information $dp_z/dy$ representative of the variation of depth in the element 37 along the y axis of the space of the depth map is stored in the block 68. The establishing of the information stored in blocks 67 and 68 will be described with details with regard to FIGS. 8A, 8B and 8C. The structure of the depth map is for example a 128-bits RGBA buffer, 16 bits being used for each of the blocks 60 to 66 and 8 bits being used for the block 67 and 8 bits being used for the block 68.

Figure 2:
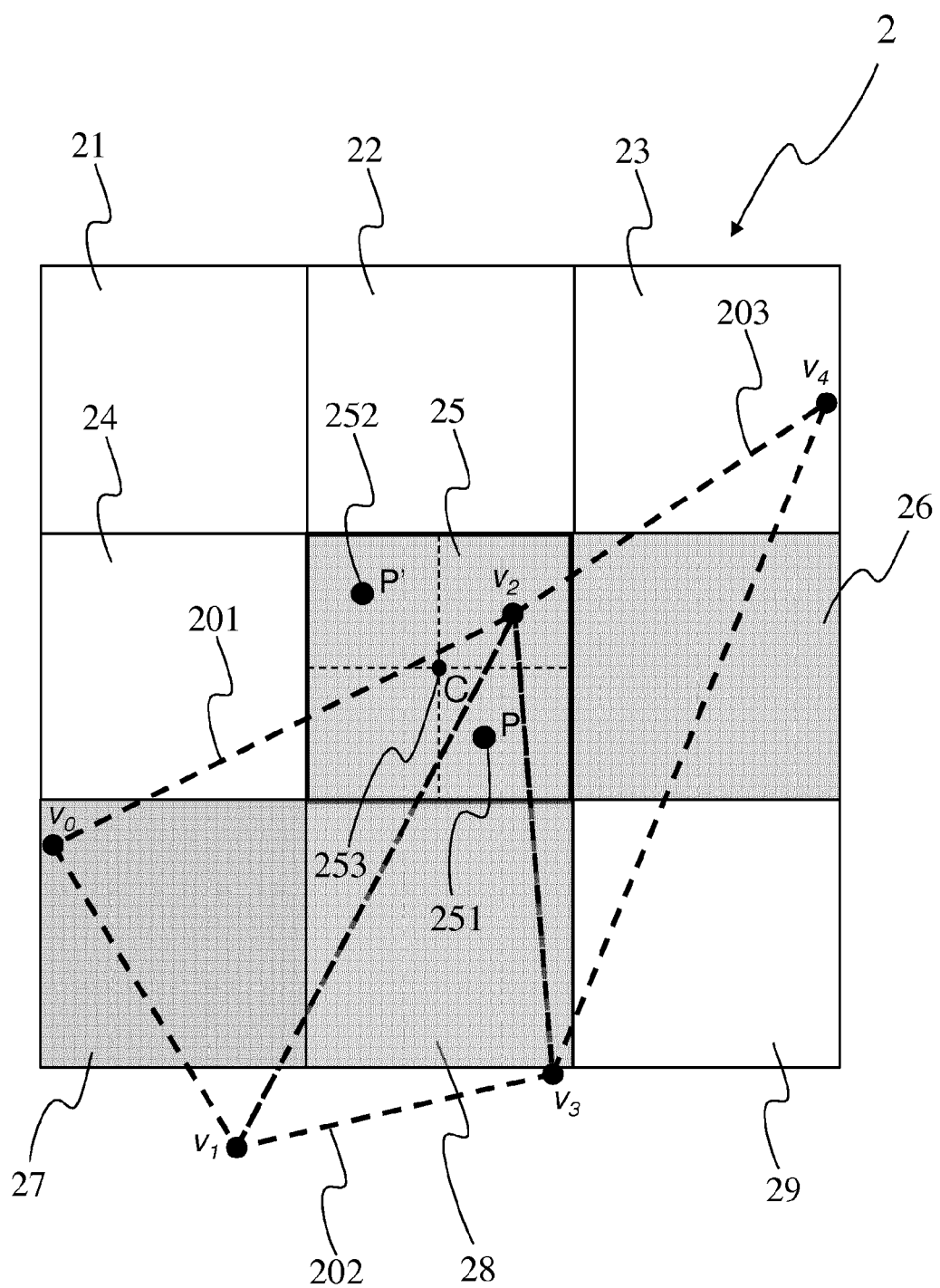
FIG. 2 shows a depth map (or part of it) of the prior art.
Figure 8A:
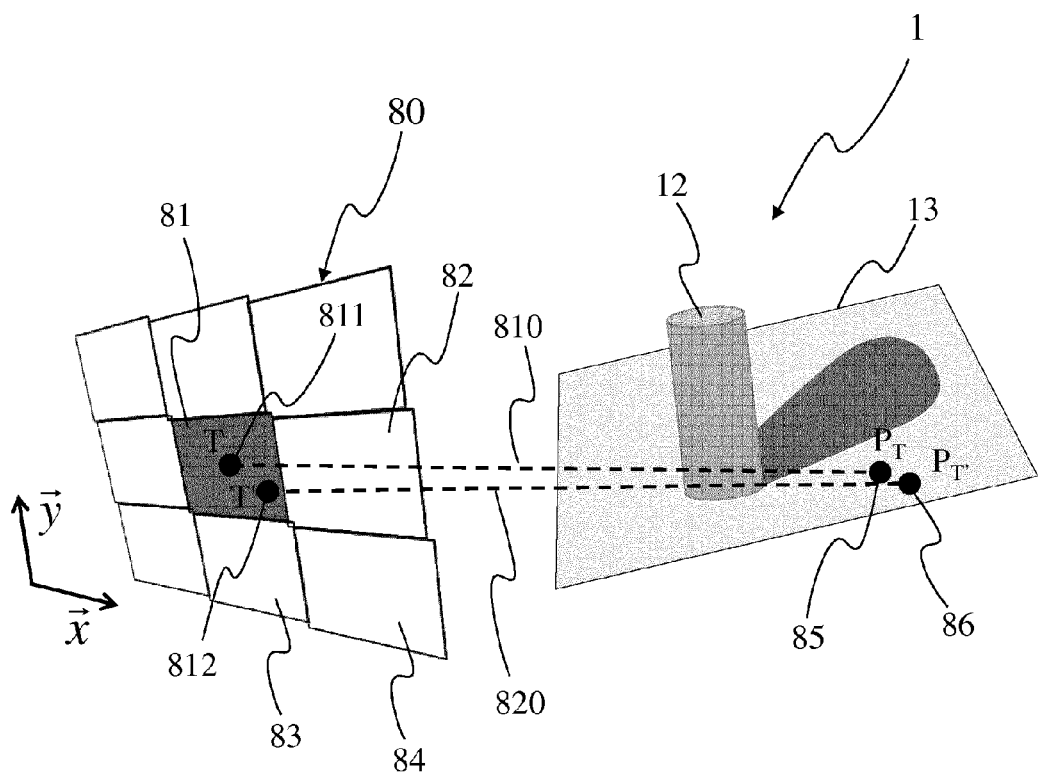
FIGS. 8A, 8B and 8C show the establishing additional depth information to be associated with elements of the depth map of FIG. 3, according to a particular embodiment of the invention.

FIG. 8A shows a part 80 of the depth map 10 of FIG. 1, according to a particular and non-limitative embodiment of the principles. This part of the depth map is centred on an element 81, which is surrounded by 8 elements of the depth map 10, among them the elements 82, 83 and 84. A depth information $p_{z,81}$ representative of the distance between the point of view 100 (not represented on FIG. 8A) and the fragment $P_T$ 85 is associated with the centre T 811 of the element 81. The point T 811 of the element 81 corresponds to the projection point of the fragment $P_T$ 85 along the viewing direction 810 which passes through the element 81. The point T' 812, which belongs to the element 81, corresponds to the projection point of the fragment $P_{T'}$ 86 along the viewing direction 820 having as origin the point of view 100 associated with the depth map 10 and passing through the element 81. The first fragment 85 and the second fragment 86 are advantageously close to each other (for example adjacent) and belongs to the same surface of an object of the scene, i.e. the surface of the object 13 which is lit by the light source L (not represented on FIG. 2) corresponding to the point of view 100 associated with the depth map 10. As to determine whether the fragment $P_{T'}$ 86 is lit, the depth of the fragment $P_{T'}$ 86 according to the point of view 100 is compared with the depth information associated with the point T' 812, which is computed by using the depth information associated with the element 81 (or with the centre T 811 of the element 81) and the one or more first information representative of the variation of depth in the element 81 that is (are) associated with the element 81. With the depth maps of the prior art, the depth of the fragment $P_{T'}$ 84 would have only been compared with the depth information $p_{z,81}$ associated with the centre T 811 of the element 81, which may have led to visible artefacts. Indeed, by considering that the surface of the object 13 to which the two fragments 85 and 86 belong is nearly tangent to the viewing directions 810 and 820 of the first and second fragments (or in another words, the angle formed by the surface normal of the object 13 and by one viewing direction 810 or 820 is high, i.e. greater than a predetermined threshold angle, for example greater than 45°), the comparison of the distance $\|LP_{T'}\|$ with the depth associated with the centre T 811 of the element 81 (and which actually corresponds to the distance $p_{z,21}=\|LP_T\|$) could establish that the second fragment $P_{T'}$ 86 is in the shadow of the first fragment $P_T$ 85, especially when the second fragment $P_{T'}$ 86 is behind the first fragment $P_T$ 85 with regard to the point of view, or when the second fragment $P_{T'}$ 86 is located further from the first fragment $P_T$ 85 with regard to the point of view. This is of course an erroneous consideration due to the imprecision of the depth information stored in depth map of the state of the art that do not comprise the first information representative of the variation of the depth inside an element of the depth map. Indeed, both fragments $P_T$ 85 and $P_{T'}$ 86 are lit by the light source L (or visible from the point of view 100) as they belong to one and same surface of the object 13 and as their projection points T 811 and T' 812 in the depth map belong to the same element 81.

Figure 8B:
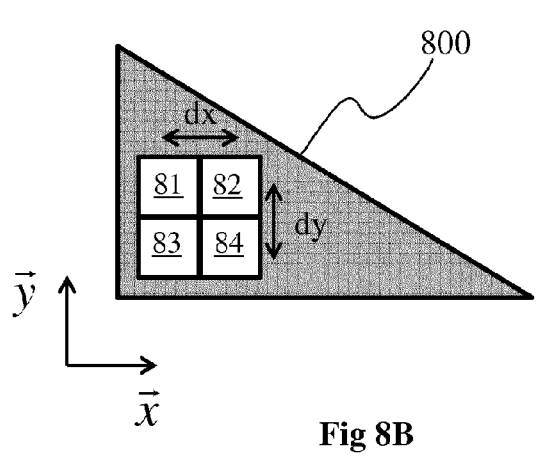
Figure 8C:
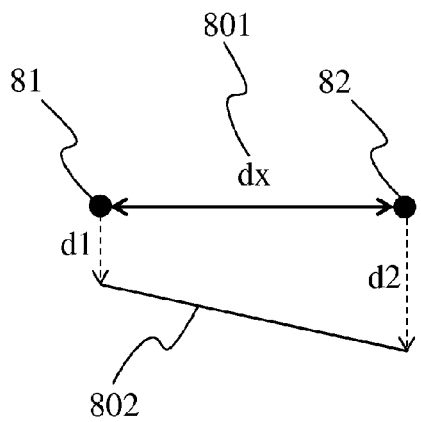

FIGS. 8B and 8C show a method to establish the one or more first information representative of the variation of depth in the element 81, according to a particular and non-limitative embodiment of the present principles. Common elements of FIGS. 8A, 8B and 8C have the same reference numbers. FIG. 8B illustrates a triangle 800 which corresponds to the projection of a surface element belonging to the scene 1. The triangle 800 comprises at least 4 elements 81, 82, 83, 84 forming a 2×2 square of elements. dx represents the distance between the centre of the element 81 and the centre of the element 82 along the horizontal axis x, in the space (x, y) of the depth map. dy represents the distance between the centre of the element 81 and the centre of the element 83 along the vertical axis y, in the space (x, y) of the depth map. The first information representative of the variation of depth in the element 81 in the space (x, y) of the depth map is advantageously established (i.e. computed or generated) during the rasterization process (which enables to determine which fragments of the scene 1 are part of the second surface elements of the scene 1 and thus of the corresponding first surface elements of the depth map) of the triangle 800 in the depth map, the rasterization process being performed by the geometry shader of a graphics hardware pipeline associated with a GPU (Graphics Processing Unit). The first information representative of the variation of depth in the element 81 along the x axis is established from the depth information associated with the centre of the element 81 and from the depth information associated with the centre of the element 82, which is advantageously adjacent to the element 81 along the x axis, by taking into account the distance dx separating the centre of the element 81 and the centre of the element 82 along the x axis. FIG. 8C illustrates the element 81 and the element 82 and the depth information d1 and d2 associated with their respective centres. d1 and d2 are represented with dashed arrows, the depth difference between the element 81 and the element 82 being represented with a line segment 802, the distance dx 801 between the centres of respectively the element 81 and the element 82 being represented by a double arrow. The first information representative of the variation of depth in the element 81 corresponds to the slope of this line segment 802, which is obtained by establishing the partial derivative of the function of the straight line 802.

The first information representative of the variation of depth in the element 81 in the space of the depth map along the x axis may be established with the following equation:

$$\frac{dp_{z,81}}{dx} = \frac{p(81-dx) - p(81)}{dx} = \frac{p(82) - p(81)}{dx} \qquad \text{equation 7}$$

with $$\frac{dp_{z,81}}{dx}$$

corresponding to the first information along the x axis associated with the element 81, also corresponding to the partial depth derivative along the x axis, p(81) corresponding to the depth information associated with the centre T 811 of the element 81, p(81-dx)=p(82) corresponding to the depth information associated with the centre of the element 82.

In a same way, a first information representative of the variation of depth in the element 82 along the y axis is established from the depth information associated with the centre of the element 81 and from the depth information associated with the centre of the element 83, which is advantageously adjacent to the element 81 along the y axis, by taking into account the distance dy separating the centre T 811 of the element 81 and the centre of the element 83 along the y axis. The first information representative of the variation of depth in the element 81 in the space of the depth map along the y axis may be established with the following equation:

$$\frac{dp_{z,81}}{dy} = \frac{p(81-dy) - p(81)}{dy} = \frac{p(83) - p(81)}{dy} \qquad \text{equation 8}$$

with $$\frac{dp_{z,81}}{dy}$$

corresponding to the first information associated with the element 81 along the y axis, also corresponding to the partial depth derivative along the y axis, p(81) the depth information associated with the centre T 811 of the element 81, p(81-dy)=p(83) corresponding to the depth information associated with the centre of the element 83.

According to a variant, only one of the two first information (either along the x axis or along the y axis) is established as to minimize the computation amount performed in the rendering pipeline of the GPU.

The first information associated with the other elements 82, 83 and 84 is advantageously established with the same group of elements 81 to 84. For example, the first information $$\frac{dp_{z,82}}{dx}$$

representative of the variation of depth in the element 22 along the x axis is established from the depth information p(82) associated with the centre of the element 82 and from the depth information p(81) associated with the centre T 811 of the element 81, by taking into account the distance dx 801 separating the centre of the element 82 and the centre of the element 81. The first information $$\frac{dp_{z,82}}{dy}$$

representative of the variation of depth in the element 82 along the y axis is established from the depth information p(82) associated with the centre of the element 82 and from the depth information p(44) associated with the centre of the element 84, by taking into account the distance dy separating the centre of the element 82 and the centre of the element 84. Both first information (along the x axis and the y axis respectively) may be established via the following equations:

$$\frac{dp_{z,82}}{dx} = \frac{p(82) - p(82-dx)}{dx} = \frac{p(82) - p(81)}{dx} \qquad \text{equation 9}$$

$$\frac{dp_{z,82}}{dy} = \frac{p(82-dy) - p(82)}{dy} = \frac{p(84) - p(82)}{dy} \qquad \text{equation 10}$$

First information representative of the local variation of the depth in the element 35 of FIG. 3 may be helpful as to determine with a greater precision the depth associated with the point P 351 or with the point P' 352, instead of assigning to these points P and P' the depth associated with the centre of the element 35 as it is done in classical depth map.

The first information stored in the depth map 10 and associated with the first element 81 of FIG. 8A may then be used for computing the depth information associated with the point T' 812 of the first element 81. The depth information $p_{z,T'}$ associated with point T' 812 is computed with the following equation:

$$p_{z,T'} = p_T + (x_{T'} - x_T)\frac{dp_{z,81}}{dx} + (y_{T'} - y_T)\frac{dp_{z,81}}{dy} \qquad \text{equation 11}$$

with $p_T = p_{z,81}$ the depth information associated with the centre T 811 of the first element 81, $x_{T'}$ and $y_{T'}$ the coordinated of the point T' 812 in the space (x, y) of the depth map 10

$x_T$ and $y_T$ coordinated of the point T 811 in the space (x, y) of the depth map 10, $$\frac{dp_{z,81}}{dx}$$

the first information representative of the variation of depth in the first element 81 along the x axis, $$\frac{dp_{z,81}}{dy}$$

the first information representative of the variation of depth in the first element 81 along the y axis.

As to determine whether the fragment $P_{T'}$ is lit or hidden from the light by the fragment $P_T$ 85, the distance $\|LP_T\|$ between the point of view 100 and the fragment $P_{T'}$ 86 is compared with the depth information $p_{z,T'}$ associated with the point T' 812 and computed via the equation 11. If $\|LP_T\|$ is less than or equal to $p_{z,T'}$ then the fragment $P_{T'}$ 86 is lit by the light source L 100 (not illustrated on FIG. 8A but illustrated on FIG. 1). If $\|LP_T\|$ is greater than $p_{z,T'}$ then the fragment $P_{T'}$ 86 is not lit by the light source L 100.

Values of the first information representative of the variation of depth in an element of a depth map may be significantly small in presence of front facing surfaces (i.e. surfaces of object(s) having a normal parallel or roughly parallel with the viewing direction passing through the center of the element 81 of the depth map) and conversely very large in presence of grazing angle surfaces (i.e. surfaces of object(s) of the scene having a normal perpendicular or roughly perpendicular to the normal of the depth map). Such amplitude requires high precision float storage and may significantly increase the depth map storage. On the other hand, as the first information represents slopes of linear function of x (along x axis of the depth map) and y (along y axis of the depth map), it may be represented by slope angles as follow:

$$\theta_x(p_{z,21}) = \arctan\left(\frac{dp_{z,21}}{dx}\right) \qquad \text{equation 12}$$

$$\theta_y(p_{z,21}) = \arctan\left(\frac{dp_{z,21}}{dy}\right) \qquad \text{equation 13}$$

These angular functions are defined in the boundary range $$\left[-\frac{\pi}{2}, \frac{\pi}{2}\right]$$

and may be stored in an unsigned 8 bits integer values for example, with a precision of $$\frac{\pi}{256},$$

i.e. approximately 0.703 degrees.).

It may be observed that for low angles, the first information values (i.e. the derivative or rate) vary slowly and the angular precision is not critical. Conversely it becomes critical near domain bounds, i.e. near $$-\frac{\pi}{2}$$

and $\pi/2$. A small angular variation represent high derivative variation that may lead to erroneous depth reconstruction. Having higher precision may require an increasing data storage of 16 or 32 bits size for instance. According to one specific and non-limitative embodiment of the invention, the angular functions representative of the variation of depth in a first element of the depth map in the space of the depth map along axis x and y, i.e. the functions $\theta_x(p_{z,81})$ and $\theta_y(p_{z,81})$, are encoded in odd power functions $x^y$ (for example $x^3$ or $x^5$) in order to compress the angular domain around 0 and give higher precision for area near the domain bounds, i.e. near $$-\frac{\pi}{2}$$

and $\pi/2$. Such function and effective compression may be expressed with an odd power function. Such an embodiment allows to record the first information (i.e. the derivatives) with a good precision with an only 8 bits data storage for each first information value. The final encoded first information values $E_{dx}(p_{z,81})$ and $E_{dy}(p_{z,81})$ (along the x axis and the y axis respectively) in an unsigned 8 bits integer are obtained as follow:

$$E_{dx}(p_{z,21}) = \left(0.5 + 0.5\left(\frac{2\times\theta_x(p_{z,21})}{\pi}\right)^n\right)\times 255 \qquad \text{equation 14}$$

$$E_{dy}(p_{z,21}) = \left(0.5 + 0.5\left(\frac{2\times\theta_y(p_{z,21})}{\pi}\right)^n\right)\times 255 \qquad \text{equation 15}$$

with n representing a positive odd integer.

The decoding as to obtain the first information values is advantageously performed in scene rendering pass where depth comparison takes place as to determine whether a fragment is lit (or whether a fragment is visible). Decoded first information values $$\frac{dp_{z,81}}{dx} \text{ and } \frac{dp_{z,81}}{dy}$$

are obtained as follow:

$$\frac{dp_{z,21}}{dx} = \tan\left(\frac{\pi}{2}\times\left(2\times\frac{E_{dx}(p_{z,21})}{255}-1\right)^{\frac{1}{n}}\right) \qquad \text{equation 16}$$

$$\frac{dp_{z,21}}{dy} = \tan\left(\frac{\pi}{2}\times\left(2\times\frac{E_{dy}(p_{z,21})}{255}-1\right)^{\frac{1}{n}}\right) \qquad \text{equation 17}$$

FIG. 9 diagrammatically shows a hardware embodiment of a device 9 configured for enriching the content associated with a first element of a depth map. The device 9 is also configured for the creation of display signals of one or several synthesis images representative of the scene 9. The device 9 corresponds for example to a personal computer (PC), a laptop, a tablet, a Smartphone or a games console.

The device 9 comprises the following elements, connected to each other by a bus 95 of addresses and data that also transports a clock signal:
- a microprocessor 91 (or CPU),
- a graphics card 92 comprising:
  - several Graphical Processor Units (or GPUs) 920,
  - a Graphical Random Access Memory (GRAM) 921,
  - a non-volatile memory of ROM (Read Only Memory) type 96,
  - a Random Access Memory or RAM 97,
  - one or several I/O (Input/Output) devices 94 such as for example a keyboard, a mouse, a webcam, and
  - a power source 98.

The device 9 also comprises a display device 93 of display screen type directly connected to the graphics card 92 to display synthesized images calculated and composed in the graphics card, for example live. The use of a dedicated bus to connect the display device 93 to the graphics card 92 offers the advantage of having much greater data transmission bitrates and thus reducing the latency time for the displaying of images composed by the graphics card. According to a variant, a display device is external to the device 9 and is connected to the device 9 by a cable or wirelessly for transmitting the display signals. The device 9, for example the graphics card 92, comprises an interface for transmission or connection (not shown in FIG. 9) adapted to transmit a display signal to an external display means such as for example an LCD or plasma screen or a video-projector.

It is noted that the word "register" used in the description of memories 921, 96, and 97 designates in each of the memories mentioned, both a memory zone of low capacity (some binary data) as well as a memory zone of large capacity (enabling a whole program to be stored or all or part of the data representative of data calculated or to be displayed).

When switched-on, the microprocessor 91 loads and executes the instructions of the program contained in the RAM 97.

The random access memory 97 notably comprises:
- in a register 970, the operating program of the microprocessor 91 responsible for switching on the device 9,
- parameters 971 representative of the scene (for example modelling parameters of the object(s) of the scene, lighting parameters of the scene).

The algorithms implementing the steps of the method specific to the invention and described hereafter are stored in the memory GRAM 921 of the graphics card 92 associated with the device 9 implementing these steps. When switched on and once the parameters 971 representative of the environment are loaded into the RAM 97, the graphic processors 920 of the graphics card 92 load these parameters into the GRAM 921 and execute the instructions of these algorithms in the form of microprograms of "shader" type using HLSL (High Level Shader Language) language or GLSL (OpenGL Shading Language) for example.

The random access memory GRAM 921 notably comprises:
- in a register 9211, the parameters representative of the scene,
- in a register 9212, the depth information associated with the centres of the elements of the depth map,
- in a register 9213, the coordinates of the vertices of the triangles overlaying an element, for each element or part of the elements of the depth map (for example the elements overlaid by triangles associated with mesh elements of an occluding object of the scene, called first object),
- in a register 9214, the parameters representative of the frontier.

According to variant, a part of the RAM 97 is assigned by the CPU 91 for storage of the identifiers and the distances if the memory storage space available in GRAM 921 is insufficient. This variant however causes greater latency time in the composition of an image comprising a representation of the environment composed from microprograms contained in the GPUs as the data must be transmitted from the graphics card to the random access memory 97 passing by the bus 95 for which the transmission capacities are generally inferior to those available in the graphics card for transmission of data from the GPUs to the GRAM and vice-versa.

According to another variant, the power supply 98 is external to the device 9.

FIG. 10 shows a method for establishing a frontier between a first object and one or more second objects in the space of a depth map implemented for example in a device 9, according to a non-restrictive particularly advantageous embodiment of the principles.

During an initialisation step 1000, the different parameters of the device 9 are updated. In particular, the parameters representative of the scene 1 represented in the image 11 as well as the depth information comprised in the depth map 10 are initialised in any way.

Then during a step 1001, the depth of a point Q of the scene is compared with the depth stored in a first element of a depth map into which the point Q projects as well as depth information stored in second elements of the depth map, the second elements advantageously surrounding the first elements, the first and second elements forming a set of elements corresponding to a sub-part of the depth map. The depth of the point Q corresponds advantageously to the distance between the point Q and the point of view associated with the depth map. The point Q advantageously belongs to a first object, or more precisely to a surface element used for modelling the first object. The set of elements advantageously comprises elements, including the first element, associated with the first object (which corresponds to elements into which surface element(s) of the first object project) and one or more second elements associated with one or more objects of the scene adjacent to the first object (which corresponds to elements into which surface element(s) of the second object(s) project). The comparison between the depth of the point Q and the depths associated with the elements of the set enables to establish which elements of the set have a depth less than or equal to the depth of the point Q.

Then during a step 1002, a line representative of a direction associated with the frontier between the first object and the second object(s) is established by using the comparison results of the step 1001. This line is for example determined by using the equations 1 and 2 or by comparing the set associated with the information resulting from the comparison results with predetermined patterns of sets of elements.

Then during a step 1003, some of the vertices of the surface elements used to model the first and second objects and projected onto the elements of the set of elements are selected according to the orientation associated with these vertices, which may be determined as a combination of the orientations of the edges adjacent to the vertices. The steps being advantageously performed in the space of the depth map, the orientations associated to the vertices of the surface elements are advantageously established from the orientations of the edges of the projection of these surface elements into the depth map, the result of the projection being a polygon (for example a triangle if the surface element is a triangle) having the same vertices as the surface element. The vertices that are selected corresponds advantageously to the vertices having a normal pointing towards the line.

Then during a step 1004, a function representative of the frontier is established from the coordinates of the selected vertices, the function being for example a piecewise linear function passing through each selected vertex or a curve passing through or close to the vertices. This frontier enables to establish with a good precision which point of an element of the set of element belongs to the first object or to the second object instead of considering that each and every point of an element is associated with the object the element is associated with. This is advantageously obtained by comparing the location of the point of the element with regard to the frontier by using the coordinates of the considered point. Establishing whether a point of an element of a depth map belong to the first object is similar to establishing whether the point of the scene associated with this point of the depth map belongs to the first object or to another object when rendering an image of the scene, especially when the point of view associated with the depth map corresponds to the point of view of the image to be rendered.

When the point of view of the depth map corresponds to the light source of the scene, the establishing of the frontier enable to determines the frontier or the border of the shadow generated by the first object which projects into the set of elements. This enables to compute sharp border of the shadow generated by the first object when rendering an image of the scene comprising the first object, the depth map being also called a shadow map.

According to a variant, the method comprises a step of rendering an image of the scene by using the information comprised in the depth map and the frontier established in the space of the depth map as to establish (i.e. compute) which points (fragments) of the scene belong to which object and/or which points (fragments) are lit by the light source and which are not lit.

According to another variant, the coordinates of the selected vertices are stored in the memory structure associated with the element(s) overlaid by the projection of the surface element to which the selected vertices belong. According to a further variant, the coordinates of all vertices (and not only the selected vertices) are stored in the memory structure associated with the element(s) overlaid by the projection of the surface element to which the selected vertices belong.

According to an optional embodiment, information representative of the variation of the depth inside an element of the depth map, in the space of the depth map, is stored in the memory structure associated with the elements of the depth map.

In an advantageous way, the fragments of the scene for which it is determined whether they belong to the first object (or belong to the shadow of it) are the fragments that are located in the vicinity of a frontier (contour) between the first object and a second object, i.e. in the vicinity of the shadow border (generated by the first object). Limiting the establishing of whether a fragment is lit or not to the fragments located in the vicinity of a shadow border enables to frontier the computational costs associated with the implementation of equation 5 for example. For example, if a fragment of the scene projects into an element of the depth map that entirely correspond to an element representing a non shadowed area of the scene (i.e. an area of the scene not occluded by the first object), i.e. to an element not crossed by the frontier such as elements 31 and 32 for example, then it is not necessary for this fragment to implement the equation 5 as it may be easily established that this fragment is not occluded by the first object, i.e. not under the shadow generated by the first object. The same reasoning applies to fragments projecting into elements of the depth map that represents a shadowed area of the scene. As to determine whether this fragment is in the shadow of the object, it is sufficient to compare the depth of this fragment with the depth associated with the element into which it projects.

Naturally, the invention is not limited to the embodiments previously described.

In particular, the invention is not limited to a method for establishing a frontier between a first object and one or more second objects in the space of a depth map but also extends to any device implementing this method and notably any devices comprising at least one GPU. The implementation of calculations necessary to the establishing of the frontier is not limited either to an implementation in shader type microprograms but also extends to an implementation in any program type, for example programs that can be executed by a CPU type microprocessor.

The use of the invention is not limited to a live utilisation but also extends to any other utilisation, for example for processing known as postproduction processing in a recording studio for the display of synthesis images for example.

The invention also relates to a method (and a device configured) for establishing the frontier or border, in a depth map, of a shadow generated by a first object. The invention further relates to a method and device for determining to which object of a scene a fragment belongs based on the established frontier as well as a method and device for determining whether a fragment of the scene is lit by the source light of the scene according to the established frontier.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, Smartphones, tablets, computers, mobile phones, portable/personal digital assistants ("PDAs"), and other devices that facilitate communication of information between end-users.

Implementations of the various processes and features described herein may be embodied in a variety of different equipment or applications, particularly, for example, equipment or applications associated with data encoding, data decoding, view generation, texture processing, and other processing of images and related texture information and/or depth information. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The present invention may be used in video game applications for example, whether via programs that can be executed in a PC or portable type computer or in specialised game consoles producing and displaying images live. The device 9 described with respect to FIG. 9 is advantageously equipped with interaction means such as a keyboard a mouse, a joystick or any other modes for introduction of commands such as for example vocal recognition being also possible.

The invention claimed is:

1. A method of rendering pixels of an image of a scene comprising a first object and at least a second object, a depth map being associated with the scene according to a point of view, at least a part of the first object and at least a part of the at least a second object being visible from the point of view associated with the depth map through a set of elements of the depth map, the first object and the at least a second object being modelled with surface elements, the method comprising:

from depth information associated with a point of the scene visible through a first element of said set of elements of the depth map, from depth information associated with said first element and from depth information associated with the other elements, called second elements, of said set of elements, establishing a line associated with a direction associated with the frontier between the first object and the at least a second object, said line having as origin a corner of said set of elements located at an opposite side of a shadow generated by said first object on the depth map;

projecting orthogonally selected vertices of said surface elements visible through said set of elements onto said line, the selected vertices corresponding to the vertices having a normal vector oriented toward said line;

establishing a frontier between the first object and the at least a second object according to information representative of locations of the projected selected vertices onto said line and distances between the locations of the projected selected vertices and corresponding selected vertices; and rendering pixels of said image of the scene associated with said depth map, the rendering of the pixels representing the first object and the at least second object being performed according to the established frontier.

2. The method according to claim 1, wherein the set of elements correspond to a block of elements centred on said first element, the second elements surrounding the first element.

3. The method according to claim 1, further comprising establishing whether said point belongs to the first object by comparing the position of a point resulting from the projection of said point into said first element with respect to said frontier.

4. The method according to claim 1, wherein the depth information associated with the first element and each second element corresponds to the depth between the point of view and a fragment of the scene associated with respectively the first element and each second element, said fragment corresponding to the fragment visible from the point of view along viewing directions passing through the first element and each second element respectively.

5. The method according to claim 1, further comprising storing, in each element of said set of elements, the coordinates of at least the selected vertices of the surface element visible through said element.

6. The method according to claim 1, further comprising storing, in each element of said set of elements, an information representative of a variation of depth in said element in the space of the depth map.

7. Computer program product, characterized in that it comprises instructions of program code for executing steps of the method according to claim 1, when said program is executed on a computer.

8. The method according to claim 1, further comprising comparing, for said point of the scene visible through a first element of said set of elements of the depth map, the depth information associated with said point with the depth information associated with said first element and with the depth information associated with the second elements, the line being established from the comparison result.

9. A non-transitory processor readable medium having stored therein instructions for causing a processor to perform the method according to claim 1.

10. A device configured for rendering pixels of an image of a scene comprising a first object and at least a second object, a depth map being associated with the scene according to a point of view, at least a part of the first object and at least a part of the at least a second object being visible from the point of view associated with the depth map through a set of elements of the depth map, the first object and the at least a second object being modelled with surface elements, the device comprising at least one processor configured for;
  from depth information associated with a point of the scene visible through a first element-of said set of elements of the depth map from depth information associated with said first element and from depth information associated with the other elements, called second elements, of said set of elements,
  establishing a line associated with a direction associated with the frontier between the first object and the at least a second object, said line having as origin a corner of said set of elements located at an opposite side of a shadow generated by said first object on the depth map;
  projecting orthogonally selected vertices of said surface elements visible through said set of elements onto said line, the selected vertices corresponding to the vertices having a normal vector oriented toward said line;
  establishing a frontier between the first object and the at least a second object according to information representative of locations of the projected selected vertices onto said line and distances between the locations of the projected selected vertices and corresponding selected vertices; and
  rendering pixels of said image of the scene associated with said depth map, the rendering of the pixels representing the first object and the at least second object being performed according to the established frontier.

11. The device according to claim 10, wherein the at least one processor is a Graphical Processor Unit (GPU).

12. The device according to claim 10, wherein the at least one processor is further configured for establishing whether said point belongs to the first object by comparing the position of a point resulting from the projection of said point into said first element with respect to said frontier.

13. The device according to claim 10, wherein the at least one processor is further configured for storing, in each element of said set of elements, the coordinates of at least the selected vertices of the surface element visible through said element.

14. The device according to claim 10, wherein the set of elements correspond to a block of elements centred on said first element, the second elements surrounding the first element.

15. The device according to claim 10, wherein the depth information associated with the first element and each second element corresponds to the depth between the point of view and a fragment of the scene associated with respectively the first element and each second element, said fragment corresponding to the fragment visible from the point of view along viewing directions passing through the first element and each second element respectively.

16. The device according to claim 10, wherein the at least one processor is further configured for storing, in each element of said set of elements, an information representative of a variation of depth in said element in the space of the depth map.

17. The device according to claim 10, the at least one processor is further configured for comparing, for said point of the scene visible through a first element of said set of elements of the depth map, the depth information associated with said point with the depth information associated with said first element and with the depth information associated with the second elements, the line being established from the comparison result.

* * * * *